United States Patent
Musschoot

(10) Patent No.: US 6,705,459 B1
(45) Date of Patent: Mar. 16, 2004

(54) TWO-WAY VIBRATORY FEEDER

(75) Inventor: Albert Musschoot, Barrington, IL (US)

(73) Assignee: General Kinematics Corporation, Crystal Lake, IL (US)

( * ) Notice: Subject to any disclaimer, the term of this patent is extended or adjusted under 35 U.S.C. 154(b) by 887 days.

(21) Appl. No.: 09/024,077

(22) Filed: Feb. 17, 1998

(51) Int. Cl.[7] .............................................. B65G 27/08
(52) U.S. Cl. ...................................... 198/763; 198/770
(58) Field of Search ................................. 198/763, 770, 198/752.1, 760

(56) References Cited

U.S. PATENT DOCUMENTS

| | | | | |
|---|---|---|---|---|
| 2,332,600 A | * | 10/1943 | Rapp ........................... | 198/763 |
| 2,936,064 A | * | 5/1960 | Schuessler ................... | 198/760 |
| 3,358,815 A | * | 12/1967 | Musschoot et al. .......... | 198/763 |
| 3,528,541 A | * | 9/1970 | Barton et al. ................ | 198/763 |
| 3,746,149 A | | 7/1973 | Schrader | |
| 4,287,056 A | * | 9/1981 | Dumbaugh et al. .......... | 198/770 |
| 4,313,535 A | * | 2/1982 | Carmichael .................. | 198/763 |
| 4,492,629 A | * | 1/1985 | Dumbaugh .................. | 198/770 |
| 5,056,652 A | * | 10/1991 | Kraus et al. ................. | 198/760 |
| 5,547,068 A | * | 8/1996 | Spurlin ........................ | 198/770 |
| 5,713,457 A | | 2/1998 | Musschoot ................... | 198/763 |

FOREIGN PATENT DOCUMENTS

| | | | | |
|---|---|---|---|---|
| FR | 698604 | * | 10/1952 | ................. 198/770 |
| RU | 2000264 | * | 9/1993 | ............. 198/752.1 |
| SU | 816889 | * | 3/1981 | ................. 198/763 |

* cited by examiner

Primary Examiner—Khoi H. Tran
(74) Attorney, Agent, or Firm—Wood, Phillips, Katz, Clark & Mortimer

(57) ABSTRACT

Complexity of construction of a vibratory feeder is minimized in an assembly including a base (10; 108, 114, 116, 118) and an elongated, generally horizontal feeder (14; 100) spaced from the base (10; 108, 114, 116, 118). A rotatably mounted eccentric (32; 126) is journaled on the feeder (14; 100) and is operable, when rotated, to impart vibration to the feeding surface (20; 104) of the feeder (14; 100). The feeder (14; 100) is interconnected to the base (10; 108, 114, 116, 118) by an interconnection that consists essentially of springs (60; 130) having first ends (62) connected to the feeder and opposite ends (64) connected to the base (10; 108, 114, 116, 118) while being located on a generally horizontal axis.

13 Claims, 3 Drawing Sheets

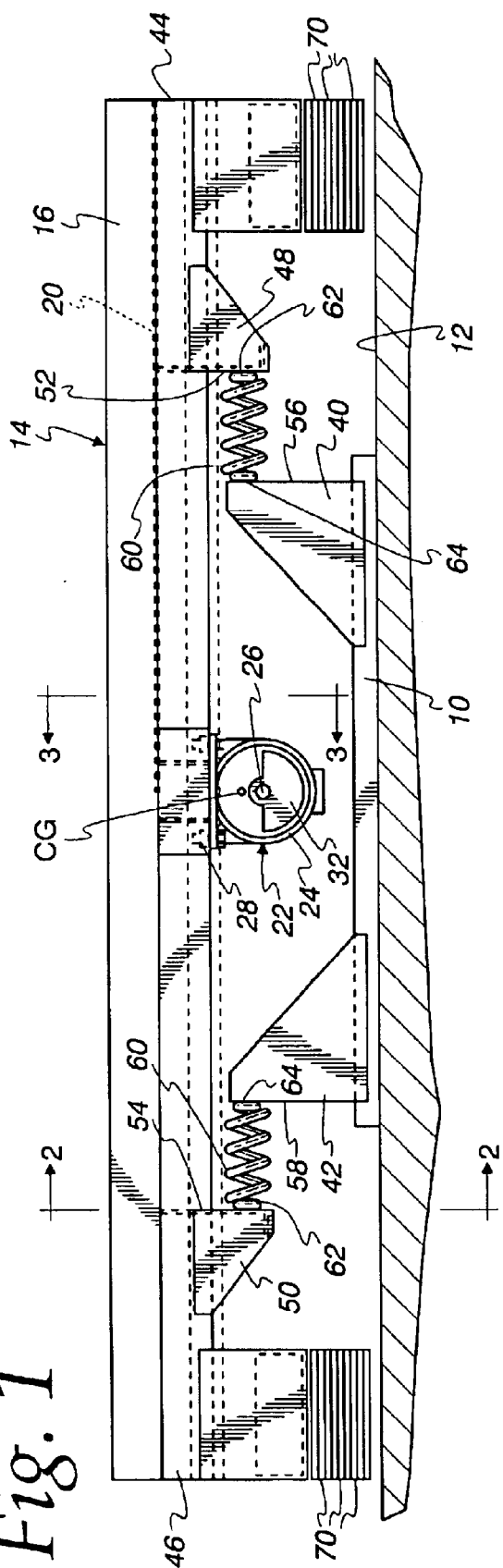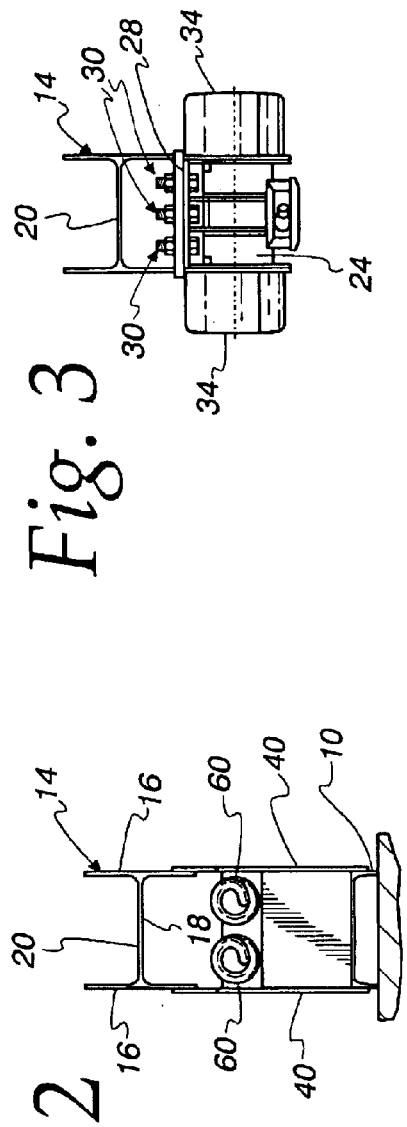

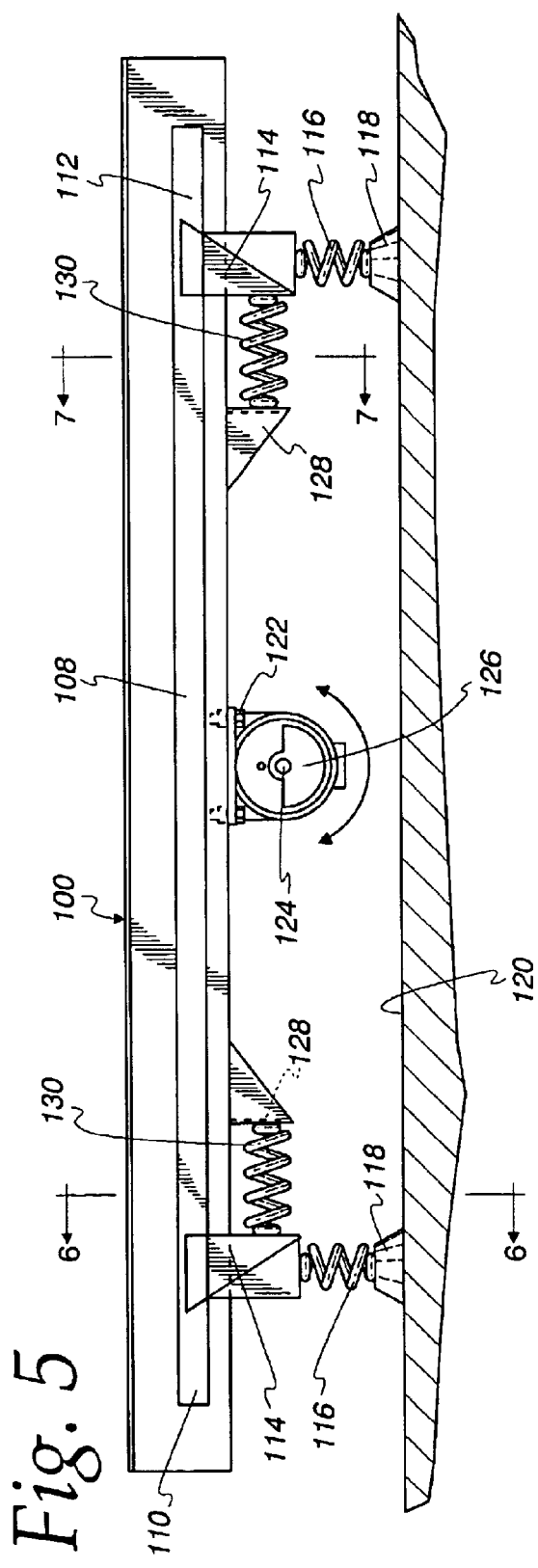
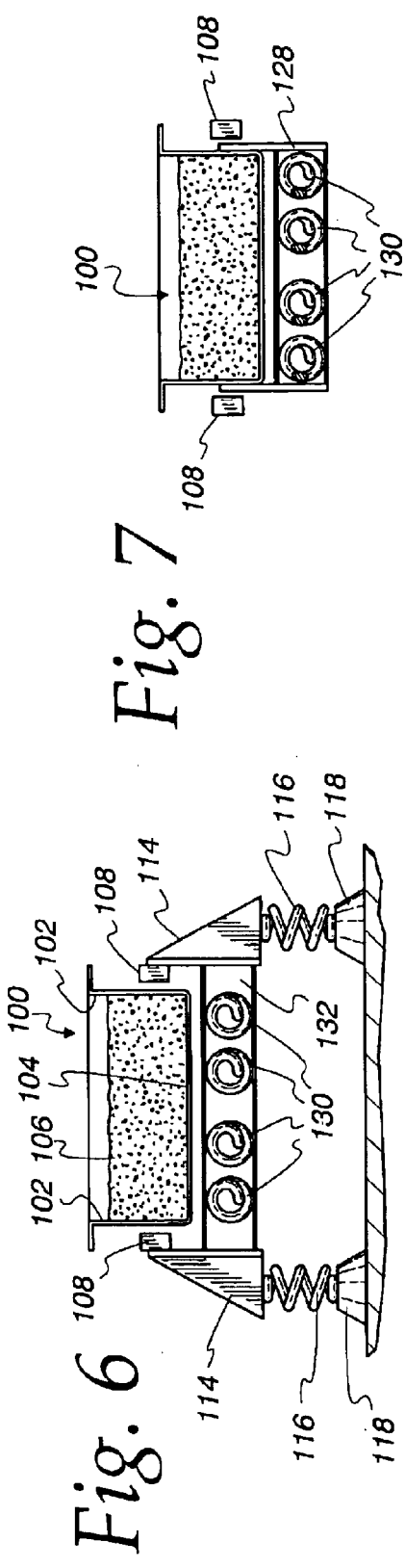
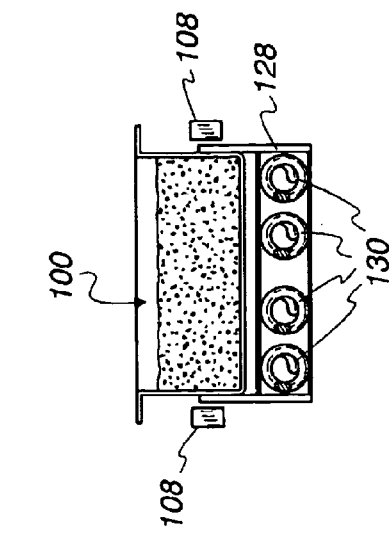

TWO-WAY VIBRATORY FEEDER

FIELD OF THE INVENTION

This invention relates to vibratory feeders or conveyors, and more particularly, to a reversible or two-way vibratory feeder.

BACKGROUND OF THE INVENTION

Two-way vibratory feeders or conveyors have substantial applications in a variety of fields. One typical application is in foundry operations. For example, castings may be delivered to the feeder at a location intermediate its ends and then the feeder is energized to feed the castings to one end or the other depending upon where it is desired to locate the castings. Typical two-way feeders include an elongated bed with an upwardly facing, generally horizontal conveying or feeding surface which terminates at opposite ends. The bed is supported on isolation springs adjacent the ends which in turn serve to mount the bed above the underlying terrain such as a floor in a factory building or the like.

Two motor and weight assemblies, which form vibration inducing systems, are secured to the bed generally centrally thereof. Each will typically include a squirrel cage motor having a rotary output shaft to which is secured in an eccentrically mounted weight. Springs in the form of plastic or fiberglass slats connect each of the motors to the bed.

Each of the vibration inducing systems is canted at approximately 45° to the bed but in directions oppositely of one another. When it is desired to feed in one direction, one of the vibration inducing systems is energized while the other remains quiescent if the opposite direction of feeding is required, then the other vibration inducing system is energized while the first remains quiescent.

In many applications, it is not unusual that there is a considerable disparity between the amount of use of the two vibration inducing systems. If one system is used to the substantial exclusion of the other, so called "false Brinnelling" of the motor bearings on the unused system will occur as a result of the vibration imparted to the bed by the first system. Lubricant may be squeezed out of the bearings as a result and when the system is finally energized, it may fail relatively quickly as a result of bearing failure.

Moreover, in foundry applications, the bed typically will be formed of metal to stand up to the continued pounding of castings. In a prior art system such as described, vertical acceleration of the feeding surface during operation will typically exceed that of gravity. As a result, after the surface has reached its highest point of movement in a cycle of vibration, it will then be accelerated downwardly more rapidly than a casting or the like conveyed by the feeder in responding to gravity. The casting will be temporarily suspended above the conveying surface but will eventually collide with it as movement of the surface begins to reverse while the casting is being moved downwardly under the influence of gravity. The result is a noise producing impact of the casting upon the metal of which the conveying surface is formed and the noise level will typically be undesirably high.

It will also be appreciated that the provision of two vibration inducing systems in a single feeder or conveyor when only one is used at any given time adds considerably to the cost of the apparatus.

The present invention is directed to overcoming one or more of the above problems.

SUMMARY OF THE INVENTION

It is the principal object of the invention to provide a new and improved two-way or reversible vibratory feeder or conveyor. More specifically, it is an object of the invention to provide a vibratory feeder wherein the problem of premature bearing failure is eliminated, the noise produced during operation is substantially reduced, and the cost of construction is reduced by the elimination of many components heretofore believed required in a construction of such a vibratory feeder.

It is also a principal object of the invention to provide a new and improved vibratory feeder of extremely simplified construction to thereby reduce initial cost as well as ongoing maintenance requirements.

An exemplary embodiment of the invention achieves the foregoing objects in a vibratory feeder that includes a base. Means define an elongated, generally horizonal feeding surface which is spaced from the base and a rotatably mounted eccentric is journaled on the surface defining means and operable, when rotated, to impart vibration to the surface. An interconnection mounts the surface defining means to the base and consists essentially of a resilient element having one end connected to the surface defining means and an opposite end connected to the base. The resilient element has its ends on a generally horizonal axis and is of sufficient stiffness to prevent the axis from shifting from a generally horizontal position.

In a preferred embodiment, there is additionally included a reversible, rotary output motor for driving the eccentric. The motor, for one direction of rotation causes feeding in one direction on the surface defining means and for the other direction of rotation, causes feeding in the opposite direction on the surface defining means.

In a preferred embodiment, the surface defining means and the eccentric have a combined center of gravity and the generally horizontal axis extends through the combined surface of gravity.

In a preferred embodiment, there are at least two of the resilient elements, one on each side of the eccentric.

Preferably, the resilient elements are coil springs.

In another facet, the invention provides a vibratory feeder that includes a base along with means defining an elongated, generally horizontal feeding surface spaced from the base and a rotatably mounted eccentric journaled on the surface defining means and operable, when rotated, to impart vibration to the surface. The feeder further includes a pair of spaced, resilient elements located on a generally horizontal axis and connecting the surface defining means in the base. The resilient elements are of sufficient stiffness as to maintain a desired spacing between the surface defining means and constitute the sole means interconnecting the base and the surface defining means.

Preferably, the eccentric comprises a weight mounted on the output shaft of a reversible motor.

In a preferred embodiment, each resilient element comprises at least two horizontally elongated, coil springs.

By still another definition, an exemplary embodiment of the invention is a two-way vibratory feeder that includes a base, a horizontally elongated feeder having an upwardly facing feeding surface and opposed ends, and a reversible motor having a rotary output shaft and generally centrally mounted between the ends of the feeder with the output shaft being generally horizonal and transverse to the direction of elongation of the feeder. At least one weight is eccentrically mounted on the output shaft and is rotatable therewith for either direction of rotation thereof. A support assembly is provided for connecting the feeder to the base and consists essentially of two spaced horizontally disposed coil springs, one on each side of the output shaft, each such spring having two ends with one end mounted on the base and the other end mounted to the feeder.

According to one embodiment, the feeder, the motor and the weight have a combined center of gravity and the springs are located on a horizontal axis that extends through the center of gravity. Adjusting weights are included on the feeder to assure passage of the horizontal axis through the combined center of gravity.

Other objects and advantages will become apparent from the following specification taken in connection with the accompanying drawings.

In a highly preferred embodiment, the feeder includes at least one elongated, generally horizontal balance bar as part of the base and which extends generally parallel to the feeding surface. The resilient element or elements are connected between the balance bar and the feeding surface. The balance bar in turn is supported above on underlying surface by generally vertical isolation springs.

DESCRIPTION OF THE DRAWINGS

FIG. 1 is a side elevation of a two-way vibratory feeder made according to the invention;

FIG. 2 is vertical section taken approximately along the line 2—2 of FIG. 1;

FIG. 3 is a sectional view taken approximately along the line 3—3 of FIG. 1;

FIG. 5 is a side elevation of a modified embodiment of the invention;

FIG. 6 is a vertical section taken approximately along the line 6—6 of FIG. 5; and FIG. 7 is a vertical section taken approximately along the line 7—7 of FIG. 5.

DESCRIPTION OF THE PREFERRED EMBODIMENTS

Figure 4:
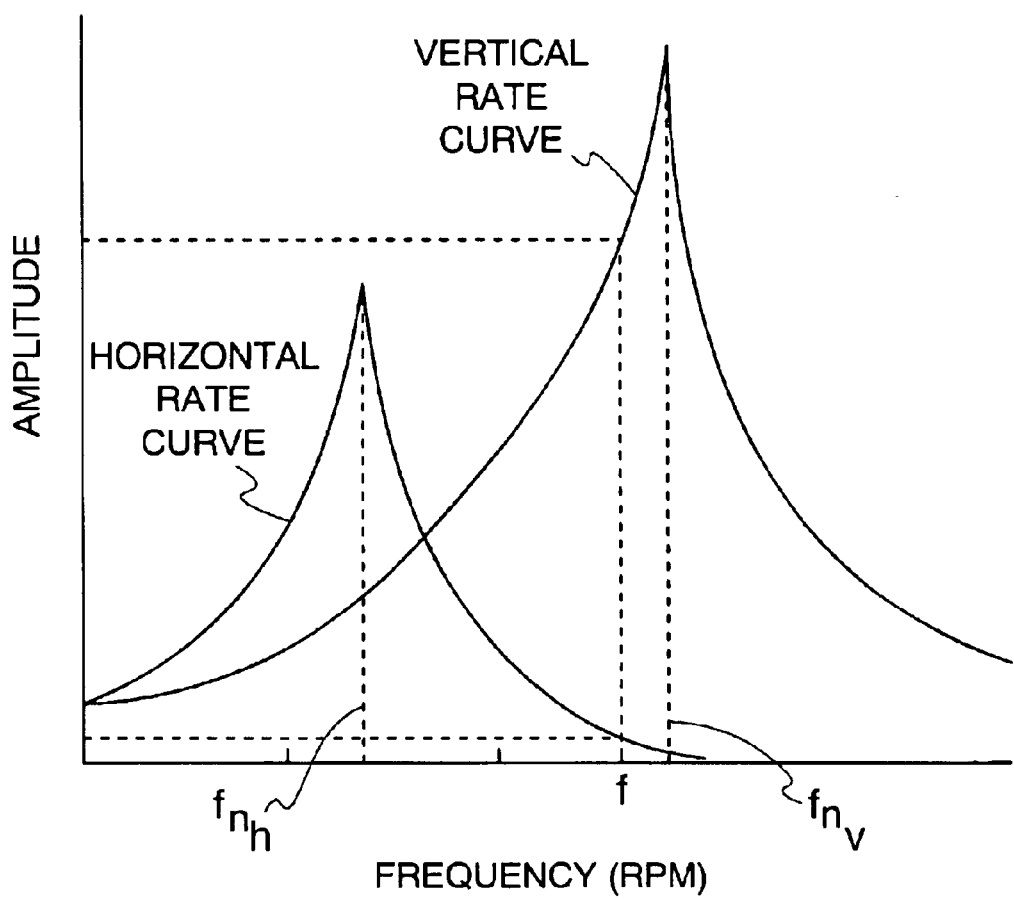
FIG. 4 is a graph illustrating certain operational characteristics of an embodiment of the invention as they relate to the spring rates of resilient elements employed in the construction of the invention.

An exemplary embodiment of the invention is illustrated in FIGS. 1–3 and is seen to include a base 10 in the form of an inverted channel that is mounted to the underlying terrain 12 which may be the floor of a building or the like. A feeder, generally designated 14, is supported above the base 10 as will be seen. However, it is to be understood that in some installations, it may be desirable that the base 10 be located above the feeder 14.

In the illustrated embodiment, the feeder 14 is in the form of a simple I-beam turned on its side so that its top and bottom plates 16 form vertical, confining side walls for its web 18. The upper surface 20 of the web 18 serves as a conveying or feeding surface.

Centrally of the feeder 14 is a vibratory exciter, generally designated 22. The same includes a reversible, variable speed electric motor 24 having a rotary output shaft 26. The motor 24 is secured to a plate 28 which in turn is secured as by welding to the plates 16 of the I-beam defining the feeder 14. Threaded fasteners and bolts, generally designated 30, may be used for the purpose.

The rotary shaft 26, on both ends thereof (only one of which is seen), mounts eccentric weights 32. As seen in FIG. 3, the eccentric weights 32 may be contained within housings 34 on both sides of the motor 24.

As noted previously, the motor 24 is preferably a reversible, variable speed motor. By reversing the direction of the rotation of the output shaft 26, the direction of conveying along the surface 20 may be reversed. Similarly, by varying the speed of the motor 20, the rate of conveying can be adjusted as well. Generally, however, it will be desirable to keep the rate of rotation of the output shaft 26 within a range for purposes to be seen.

In a usual case, the motor 24 will also be fitted with an electronic brake of known configuration so that when it is de-energized, rotation of the shaft 26 may be stopped rather abruptly rather than allowing the shaft 26 to coast for several seconds or even longer.

The base includes upstanding pedestals 40 and 42 located on opposite sides of the exciter 22. Spaced axially outwardly from the pedestals 40 and 42 toward the ends 44 and 46 of the feeder 14 are downwardly directed projections 48 and 50. The projections are secured to the underside of the feeder 14 and have vertical surfaces 52 and 54 facing corresponding vertical surfaces 56 and 58 on the pedestals 40 and 42. Horizontally elongated metallic coil springs 60 are located between the surfaces 52 and 56 and the surfaces 54 and 58 and are fastened thereto at their respective ends 62 and 64 as by bolts or the like. In some instances, conventional air bags may be used in lieu of the springs 60.

As shown in FIG. 2, the springs on each side of the motor 22 may be paired. For that matter, depending upon the size of the feeder 14, more than two springs may be included in any given spring assembly or resilient element defined thereby.

The springs 60 have two different springs rates. A first is the vertical spring rate which is the spring rate that comes into play when one tries to axially compress or extend the springs, i.e., bring the ends 62 and 64 toward or away from one another. The second is known as the horizontal spring rate which is the spring rate that comes into play when one tries to bend one or both ends of the spring relative to the spring longitudinal axis. In a preferred embodiment, the springs 60 have a vertical spring rate of 3,200 lbs. per inch and a horizontal spring rate of 1,237 lbs. per inch. The springs 60 are sufficiently stiff as to support the feeder 14. That is, the springs 60 will not sag to depart substantially from their alignment on a horizontal axis.

Those skilled in the art will recognize that the feeder 14 in the exciter 22 and its various components have a combined center of gravity (CG). It is found to be desirable that the horizontal axis on which the springs 60 are disposed pass through the center of gravity (CG). Thus, the invention contemplates the mounting of plate-like weights 70 to both ends 44 and 46 of the feeder 14 to adjust the location of the center of gravity (CG) so that it is located in the plane defined by the horizontal axis of the springs 60.

FIG. 4 illustrates a plot of amplitude versus frequency (the latter in RPM) of spring movement according to both the horizontal spring rate curve and the vertical spring rate curve. The designation "fnh" illustrates the natural horizontal frequency of the system while the designation "fnv" illustrates the natural vertical frequency of the system.

It is preferred to operate at a frequency of about 90–95% of the vertical natural frequency. Operation in this range assures proper conveying movement while avoiding overstressing of the springs 60.

In operation, the springs 60 act to amplify the vibration induced upon the feeder 14 by the exciter 22. The locus of a point on the feeder 14 is a very much flattened oval pattern which is highly horizontally elongated. This is highly desirable because it minimizes or eliminates separation between castings on the feeding surface 20 and the feeding surface to eliminate the noise of impact of the castings thereon.

The springs 60 also act as isolation springs when the frequency of operation is equal to 1.4 or more of the horizontal natural frequency. In a preferred embodiment, it is preferred that the frequency of operation "f" is approximately three times the natural horizontal frequency.

It will be appreciated from FIG. 4, keeping in mind that the springs 60 are disposed horizontally so that the vertical rate curve applies to horizontal movement and the horizontal rate curve applies to vertical movement, that vertical displacement of the surface 20 is minimal while substantial horizontal displacement occurs to assure adequate conveying with minimal noise generation as mentioned previously. This embodiment of the invention eliminates the need for isolation springs separate from amplification springs as well as springs interconnecting one or more exciters to the feeder itself. The vibratory feeder of the invention is a picture of simplicity, requiring but a single exciter, at least one spring assembly, a base and a feeder having a feeding surface. Thus, it will be readily appreciated by those skilled in the art that the objects of the invention have in fact been accomplished.

A modified and highly preferred embodiment is illustrated in FIGS. 5–7 inclusive. A trough, generally designated 100, defines a generally horizontal conveying surface. The trough 100 includes upstanding, spaced sidewalls 102 connected by a bottom wall 104 upon which material 106 to be conveyed is supported. The trough 100 is flanked by two horizontally elongated balance bars 108, one adjacent each of the upstanding sidewalls 102. At the ends 110, 112, of each balance bar 108, a depending pedestal 114 is mounted. The pedestals 114 are, in turn, mounted on the upper ends of vertically oriented coil springs 116 which, in turn, are supported on pedestals 118 secured to the underlying surface 120. Of course, it will be recognized that the mounting thus provided could be as a result of a suspension system if desired.

A bi-directional, that is, reversible, electric motor 122 is mounted to the underside of the trough 100 at a central location along the length of the trough 100. The motor 122 has a horizontally directed output shaft 124 upon which an eccentric weight 126 is mounted. In a preferred embodiment, the output shaft 124 extends to both sides of the body of the motor 122 and each end of the shaft 124 mounts in an eccentric weight 126.

Inwardly of the pedestals 114 mounting the balance bars 108, the undersurface of the trough 100 mounts downwardly extending projections 128. Coil springs 130, which may be the same as the coil springs 60 in the first embodiment, extend between the projections 128 and an I-beam 132 which interconnects the pedestals 114 below the bottom surface 104 of the trough 100.

As a result of this construction, a two-way vibratory feeder similar to that described in connection with FIGS. 1–4 is provided. In addition, the embodiment shown in FIGS. 5–7 possesses a further advantage in that the springs 116 provide isolation to prevent any substantial vibration as a result of operation of the conveyor from being transmitted to the underlying terrain 120. Moreover, and most importantly, the balance beams 108 serve to counterbalance horizontal vibratory forces induced as a result of operation of the motor 122. In this respect, the mass of the balance bars 108 is generally chosen to equal the mass of the trough 100 and the projections 128 and an expected amount of material 106 on the surface 104. In operation, because horizontal movement of the trough 100 in one direction will tend to compress the coil springs 130, the resulting reaction during operation will be to cause the balance beams 108 to move in the opposite direction of the trough 100, thus serving as a counterbalance to the vibration induced in the trough 100's operation of the motor 122 and the eccentric weight 26. As a result, very little vibration in the horizontal direction is present at the isolation springs 116 and that which is present is effectively isolated by the springs 116. Thus, the embodiment of FIGS. 5–7 is capable of providing conveying or feeding motion in either of two directions, depending upon the direction of rotation of the shaft 124 while at the same time, providing a counterbalance of such force within the base for the apparatus to prevent the transmission of the vibratory force to the underlying terrain. This presents a substantial advantage in terms of reducing the vibration imparted to the environment while retaining all of the advantages of the embodiment illustrated in FIGS. 1–4, as enumerated above.

What is claimed is:

1. A vibratory feeder comprising:

a base;

means defining an elongated, generally horizontal feeding surface spaced from said base;

a rotatably mounted eccentric journaled on said surface defining means and operable, when rotated, to impact vibration to said surface; and an interconnection mounting said surface defining means to said base and consisting essentially of a resilient element having one end connected to said surface defining means and an opposite end connected to said base, said resilient element having said ends on a generally horizontal axis and being of sufficient stiffness to prevent said axis from shifting from a generally horizontal position.

2. The vibratory feeder of claim 1 further including a reversible rotary output motor for driving said eccentric, said motor for one direction of rotation, causing feeding in one direction on said surface defining means and for the other direction of rotation, causing feeding in the opposite direction on said surface defining means.

3. The vibratory feeder of claim 1 wherein said surface defining means and said eccentric have a combined center of gravity and said generally horizontal axis extends through said combined center of gravity.

4. The vibratory feeder of claim 1 wherein there are at least two said resilient elements, one on each side of said eccentric.

5. The vibratory feeder of claim 4 wherein said resilient elements are coil springs.

6. The vibratory feeder of claim 1 wherein said base includes a horizontally elongated balance bar and said resilient element opposite end is connected to said balance bar.

7. The vibratory feeder of claim 6 wherein said balance bar is supported by non-horizontal isolation springs.

8. A two way vibratory feeder comprising:

a base;

a horizontally elongated feeder having an upwardly facing feeding surface and opposed ends;

a reversible motor having a rotary output shaft and generally centrally mounted between said ends on said feeder, said output shaft being generally horizontal and transverse to the direction of elongation of said feeder;

at least one weight eccentrically mounted on said output shaft and rotatable therewith for either direction of rotation thereof; and a support assembly for connecting said feeder to said base and consisting essentially of two spaced, horizontally disposed coil springs, one on each side of said output shaft, each said spring having two ends with one end operatively mounted to said base and the other end operatively mounted to said feeder.

9. The vibratory feeder of claim 8 wherein said feeder, said motor and said weight have a combined center of gravity and said springs are located on a horizontal axis extending through said center of gravity.

10. The vibratory feeder of claim 9 wherein said feeder includes adjusting weights mounted thereon to assure passage of said horizontal axis through said combined center of gravity.

11. A two-way vibratory feeder comprising:

a horizontally elongated feeding surface;

a horizontally elongated balance bar generally parallel to said feeding surface;

a reversible motor carrying an eccentric weight affixed to said feeding surface;

spaced, horizontal coil springs interconnecting said balance bar and said feeding surface and generally vertical isolation springs connected to said balance bar and adapted to be connected to a fixed object for mounting the conveyor on said fixed object.

12. The vibratory conveyor of claim 11 wherein there are two balance bars, one on each side of said feeding surface.

13. The vibratory conveyor of claim 11 wherein said springs are metallic.

* * * * *